(12) United States Patent
Li et al.

(10) Patent No.: US 11,775,888 B2
(45) Date of Patent: Oct. 3, 2023

(54) INTELLIGENT SCHEDULING TABLE GENERATION METHOD BASED ON MULTI-SOURCE DATA ANALYSIS OF BUSES

(71) Applicants: Aerospace Internet of Things Technology Co., Ltd, Beijing (CN); China Aerospace Times Electronics Co., Ltd, Beijing (CN)

(72) Inventors: Junjun Li, Beijing (CN); Chunlei Zheng, Beijing (CN); Xuedong Zhao, Beijing (CN); Hao Dong, Beijing (CN); Lin Gao, Beijing (CN); Xuelin Yang, Beijing (CN); Fengting Shen, Beijing (CN)

(73) Assignees: Aerospace Internet of Things Technology Co., Ltd, Beijing (CN); China Aerospace Times Electronics Co., Ltd, Beijing (CN)

( * ) Notice: Subject to any disclaimer, the term of this patent is extended or adjusted under 35 U.S.C. 154(b) by 0 days.

(21) Appl. No.: 18/167,316

(22) Filed: Feb. 10, 2023

(65) Prior Publication Data
US 2023/0186188 A1 Jun. 15, 2023

Related U.S. Application Data

(63) Continuation of application No. PCT/CN2021/127387, filed on Oct. 29, 2021.

(30) Foreign Application Priority Data

Oct. 19, 2021 (CN) .......................... 202111215936.2

(51) Int. Cl.
*G06Q 10/047* (2023.01)
*G06Q 50/30* (2012.01)

(52) U.S. Cl.
CPC .......... *G06Q 10/047* (2013.01); *G06Q 50/30* (2013.01)

(58) Field of Classification Search
CPC ...... G06Q 10/047; G06Q 50/30; G08G 1/123; G08G 1/0104
See application file for complete search history.

(56) References Cited

U.S. PATENT DOCUMENTS

2017/0011629 A1 1/2017 Lau
2017/0068755 A1 3/2017 Wang et al.

FOREIGN PATENT DOCUMENTS

CN 101789175 A 7/2010
CN 106504518 A 3/2017
(Continued)

OTHER PUBLICATIONS

Enlish translation of CN-109859459-A (Year: 2019).*
First Office Action issued in counterpart Chinese Patent Application No. 202111215936.2, dated Apr. 20, 2022.

*Primary Examiner* — Shon G Foley
(74) *Attorney, Agent, or Firm* — Westbridge IP LLC (57) ABSTRACT

Disclosed is an intelligent scheduling table generation method based on multi-source data analysis of buses, including following steps: integrating business data and cashier data of a bus scheduling system, analyzing the running situation of each line by using an intelligent scheduling algorithm, calculating passenger flow data of boarding and dropping off buses according to cashier data of card swiping for boarding buses, and scientifically and reasonably obtaining the data of each line in the intelligent scheduling table, such as of the number of upgoing and downgoing vehicles, departure time periods, planned shifts, planned circle time, so as to obtain the intelligent scheduling table which accords with the characteristics of morning, midday and evening (Continued)

peak of each line and adjusts the departure interval in real time according to the actual running situation of the lines.

3 Claims, 5 Drawing Sheets

(56) References Cited

FOREIGN PATENT DOCUMENTS

| CN | 108022051 | A | | 5/2018 |
|----|-----------|---|---|--------|
| CN | 108806302 | A | | 11/2018 |
| CN | 109859459 | A | * | 6/2019 |
| CN | 109886491 | A | | 6/2019 |
| CN | 110084397 | A | | 8/2019 |
| CN | 111340406 | A | | 6/2020 |

* cited by examiner

FIG. 1

Calculating the electronic swiping times $W_t = \sum_{j=1}^{sc} C_j$ of the bus vehicle numbered as $B_n$ in the line $L_k$ at the stop $S_t$ on the dth day, the electronic swiping times $V_t = \sum_{n=1}^{BC} W_t$ of all vehicles in the line $L_k$ at the stop $S_t$ on the dth day, the electronic swiping times $V_n = \sum_{t=1}^{su+sp} W_t$ of the bus vehicle numbered as $B_n$ in line $L_k$ at all stops on the dth day, the electronic swiping times $V_d = \sum_{n=1}^{BC} V_n$ of all vehicles in the line $L_k$ at all stops on the dth day, the total cash charges $M_n$ of bus vehicle numbered as $B_n$ in the line $L_k$ at all stops on the dth day, total cash charges $M_d = \sum_{n=1}^{BC} M_n$ in the line $L_k$ at all stops on the dth day, the number of cash charges $R_d = \dfrac{\sum_{n=1}^{BC} M_n}{Y}$ at all stops in the line $L_k$ on the dth day, and the cashier coefficient $\lambda_t = \dfrac{V_t}{V_d} = \dfrac{\sum_{n=1}^{BC} W_t}{\sum_{n=1}^{BC} V_n}$ at each stop in the line $L_k$ on the dth day — A1

Calculating cash times $R_t = R_d * \lambda_t$ of the line $L_k$ at the stop $S_t$ on the dth day and the number of boarding passengers $P_t = V_t + R_t$ of the line $L_k$ at the stop $S_t$ on the dth day according to the cashier times $R_d$ and cashier coefficient $\lambda_t$ — A2

FIG. 2

Using weighted arithmetic mean respectively on the historical cycle time and historical departure shifts of each vehicle within time periods of the starting time and ending time to obtain the historical average cycle time and historical average shifts for upgoing and downgoing of each line according to the historical operation shift data, combined with the line number, starting time and ending time in the intelligent scheduling table obtained in step 4, where the historical average cycle time is the planned cycle time and the historical average shifts are the planned departure shifts — B1

Predicting the line passenger flow at the execution time of the scheduling table through a machine learning algorithm LightGBM according to the line passenger flow, calculating the passenger flow of each line at the starting time and the ending time in the result of step 4, respectively calculating running times of each vehicle in each time period = (ending time - starting time)/2* the planned cycle time of the upgoing or the downgoing, and the number of allocated buses in each line at the starting time and ending time = the passenger flow in this time period/(single-ride average passenger capacity*the running times of each bus in each time period), where the single-ride average passenger capacity is obtained from the passenger flow data of each line — B2

FIG. 3

| Actual departure shifts in each time period = passenger flow in this time period/single-ride average passenger capacity | C1 |

| Deviation threshold = actual departure shifts/planned departure shifts in each time period. If the deviation threshold is within the normal range, operation time per shift = (ending time - starting time)/actual departure shifts, otherwise, initial departure interval = (ending time - starting time)/2* (actual departure shifts + planned departure shifts) | C2 |

| Predicting the cross-section passenger flow of the at execution time of the scheduling table through the machine learning algorithm LightGBM according to the cross-section passenger flow, with the initial congestion coefficient = the maximum cross-section passenger flow/number of passengers in each time period at the execution time, adjustment time of congestion departure interval = the actual departure interval * congestion coefficient * congestion adjustment parameters, where the congestion adjustment parameters are set according to the actual situation of buses | C3 |

| When the congestion coefficient > normal threshold coefficient, initial departure interval time = operation time per shift - adjustment time of congestion departure interval, and when the congestion coefficient < normal threshold coefficient, initial departure interval time = operation time per shift + adjustment time of congestion departure interval, where the normal threshold coefficient is set according to the actual situation of buses | C4 |

FIG. 4

```
┌─────────────────────────────────────────────────────────────────┐
│ Calculating the congestion coefficient = the maximum cross-section passenger │
│ flow/number of passengers at the real-time stop, the adjustment time of      │
│ congestion departure interval = initial departure interval * congestion      │
│ coefficient * congestion adjustment parameters, where initial values of the  │
│ congestion adjustment parameters are set according to the actual situation of│──── D1
│ buses; the large interval or traffic jam coefficient = the maximum distance  │
│ between two buses/the normal distance threshold, the large interval or traffic│
│ jam adjustment time = initial departure interval * large interval or traffic jam│
│ coefficient * large interval or traffic jam adjustment parameters, where initial│
│ values of large interval or traffic jam adjustment parameters are set based on │
│ the actual situations of buses                                                │
└─────────────────────────────────────────────────────────────────┘
                                    │
                                    ▼
┌─────────────────────────────────────────────────────────────────┐
│ When the congestion coefficient > the normal threshold coefficient, with the │
│   normal threshold coefficient set according to the actual situation of buses, │
│ adjusted departure interval time = initial departure interval-adjustment time of│──── D2
│  congestion departure interval; when the congestion coefficient < the normal │
│   threshold coefficient, the adjusted departure interval time = initial departure│
│         interval + adjustment time of congestion departure interval          │
└─────────────────────────────────────────────────────────────────┘
                                    │
                                    ▼
┌─────────────────────────────────────────────────────────────────┐
│ The large interval or traffic jam coefficient > the normal threshold coefficient,│
│   with the normal threshold coefficient set according to the actual situation of │
│   buses, the adjusted departure interval time = initial departure interval-large│──── D3
│  interval or traffic jam adjustment time; when the congestion coefficient < the │
│      normal threshold coefficient, the adjusted departure interval time = initial│
│           departure interval + large interval or traffic jam adjustment time     │
└─────────────────────────────────────────────────────────────────┘
                                    │
                                    ▼
┌─────────────────────────────────────────────────────────────────┐
│   Calculating whether the congestion coefficient reaches the normal threshold │
│      every 1 minute, and training the congestion adjustment parameters and the│──── D4
│  congestion coefficient by using a deep neural network algorithm until optimal│
│    congestion adjustment parameters, large interval or traffic jam adjustment │
│                          parameters are obtained                              │
└─────────────────────────────────────────────────────────────────┘
                                    │
                                    ▼
┌─────────────────────────────────────────────────────────────────┐
│ Using the congestion adjustment parameters, the large interval or the traffic │
│ jam adjustment parameters obtained in fourth step to update the congestion    │──── D5
│ adjustment parameters, the large interval or the traffic jam adjustment       │
│ parameters in first step to obtain a final real-time departure interval       │
└─────────────────────────────────────────────────────────────────┘
```

FIG. 5

INTELLIGENT SCHEDULING TABLE GENERATION METHOD BASED ON MULTI-SOURCE DATA ANALYSIS OF BUSES

CROSS-REFERENCE TO RELATED APPLICATIONS

This application is a continuation of PCT/CN2021/127387, filed on Oct. 29, 2021, which claims priority to Chinese Patent Application No. 202111215936.2, filed on Oct. 19, 2021, the contents of which are hereby incorporated by reference.

TECHNICAL FIELD

The application relates to the technical field of intelligent transportation, and in particular to an intelligent scheduling table generation method based on multi-source data analysis of buses.

BACKGROUND

Multi-source data analysis of buses refers to the information processing technology that uses computers to analyze and mine the buses data obtained from multiple data sources in time sequence to achieve the required goals. Because of the different composition of domestic and foreign traffic data sources, the proportion of different data sources is also different, and the research points and technologies in multi-source data analysis of buses are also obviously different, and intelligent scheduling table generation methods of buses are also different.

At present, all the intelligent scheduling generation methods in the field of buses have the following limitations: firstly, some types of data are mostly used as the main data, and the data of dispatching system are not fully utilized, so the calculation results fail to meet the requirements of buses business; secondly, special conditions, such as crowed passengers, traffic jam and long interval and how to dynamically adjust the departure interval are not considered, and the real-time demand are not met; thirdly, an algorithm model only meets the lines under same conditions, but fails to meet all the lines under different actual operation conditions at the same time, and lacks the research on vehicle scheduling in the morning, midday and evening peak hours; fourthly, boarding and drop-off passenger flow data is usually obtained directly by passenger flow equipment, and the data source usually includes card swiping data of dropping off. However, card swiping data of boarding is not fully utilized to accurately calculate card swiping data of dropping off, and the needs of large, medium and small cities without passenger flow equipment, only with card swiping of boarding and without card swiping of dropping off are not met. Therefore, the application proposes the intelligent scheduling table generation method based on multi-source data analysis of buses to solve the problems existing in the prior art.

SUMMARY

In view of the above problems, the objective of the present application is to propose an intelligent scheduling table generation method based on multi-source data analysis of buses. This method intelligently generates the scheduling table according to the situation of each buses line, scientifically and reasonably obtains the data, such as the number of bus upgoing and downgoing each line in the intelligent scheduling table, the departure time period, the planned shifts and the planned circle time, and intelligently adjusts the departure interval in real time according to the current running situation of vehicles, so as to achieve the purpose of shortening waiting time of passengers and relieving compartment congestion, and optimizing utilization of vehicle resources.

In order to realize the purpose of the application, the application is realized by the following technical scheme: the intelligent scheduling table generation method based on multi-source data analysis of buses includes the following steps:

defining LC as the number of all lines owned by a bus company, representing a serial number of one of lines with $L_k$, then $1 \le k \le LC$, representing the number of all vehicles in the line $L_k$ by BC, representing a serial number of one of bus vehicles in the line $L_k$ by $B_n$, then $1 \le n \le BC$, representing upgoing and downgoing of lines by ud, wherein ud is 0 for downgoing, 1 for upgoing, and representing a serial number of one of bus stops in the line $L_k$ by $S_t$, wherein a serial number range of up-going stops is $1 \le t \le su$, su is the number of all up-going stops in the line $L_k$, sp is the number of all down-going stops in the line $L_k$, a serial number range of down-going stops is $su+1 \le t \le su+sp$; indicating the dth day from the current day by d, $1 \le d \le D$, and indicating the maximum number of days with D from a selected time range to the current day; recording electronic swiping times of one of bus vehicles numbered as $B_n$ in the line $L_k$ passing though the stop $S_t$ in ith shift on the dth day as $C_i$, the number of shifts of this bus vehicle as sc, electronic swiping times of the bus vehicle numbered as $B_n$ in the line $L_k$ at the stop $S_t$ on the dth day as $W_t$, electronic swiping times of all vehicles in the line $L_k$ at the stop $S_t$ on the dth day as $V_t$, electronic swiping times of the bus vehicle numbered as $B_n$ in the line $L_k$ at all stops on the dth day as $V_n$, electronic swiping times of all vehicles in the line $L_k$ at all stops on the dth day as $V_d$, total cash charge of the bus vehicle numbered as B in the line $L_k$ at all stops on the dth day as $M_n$, total cash charge of all stops in the line $L_k$ on the dth day with $M_d$, and the ticket price of the line $L_k$ as Y yuan, the number of cash charges at all stops in the line $L_k$ on the dth day as $R_d$, cash times at the stop $S_t$ of the line $L_k$ on the dth day as $R_t$, a cashier coefficient at each stop of the line $L_k$ on the dth day as $\lambda_t$, and the number of passengers boarding at the stop $S_t$ of the line $L_k$ on the dth day as $P_t$:

step 1: firstly acquiring boarding cashier data of buses, including integrated circuit (IC) card, online, Union-Pay offline, electronic cash and cash data, then acquiring real-time operation shift data, vehicle real-time GPS, actual cycle time and historical operation shift data in a bus dispatching system;

step 2: converting the boarding cashier data into passenger flow data of the number of people boarding and dropping off through a passenger flow reverse compensation algorithm;

step 3: analyzing the passenger flow data of boarding and dropping off at each stop of each line obtained in step 2 to obtain morning, midday and evening peak time periods, and a passenger flow and a cross-section passenger flow of each line;

step 4: analyzing the morning, midday and evening peak time periods, line busy situation and line passenger flow data obtained in step 3 to obtain the morning, midday and evening peak time periods of the each line, corresponding the morning, midday and evening peak time periods to three starting time and ending time respectively, and dividing non-morning, midday and evening peak time periods according to the bus time length θ and obtaining a line number, starting time and ending time of a intelligent scheduling table, so that each line makes departure plans according to different peak time;

step 5: obtaining the number of allocated buses, planned departure shifts, planned circle time, upgoing and downgoing in the intelligent scheduling table by a scheduling optimization algorithm through using the historical operation shift data obtained in step 1, the morning, midday and evening peak time periods and the passenger flow of each line obtained in step 3, combined with the line number, starting time and ending time of the intelligent scheduling table obtained in step 4;

step 6: obtaining an initial departure interval through a departure interval calculation algorithm through using the line number, the starting time and the ending time obtained in step 4, the number of allocated buses, the planned departure shifts, the planned circle time, the upgoing and downgoing in the intelligent scheduling table obtained in step 5 and the cross-section passenger flow obtained in step 3;

step 7: calculating a real-time interval distance Lp of two adjacent vehicles and the actual circle time Tg of each bus through using the vehicle real-time GPS and the actual circle time obtained in step 1, where when the Lp and the Tg are respectively greater than a maximum allowable threshold or less than a minimum allowable threshold, it is judged that the vehicles drive abnormally, and information of vehicle large interval or traffic jam is judged;

step 8: adjusting departure interval time through a real-time departure interval adjustment algorithm by using the real-time operation shift data obtained in step 1, the real-time cross-section passenger flow, the real-time morning, midday and evening peak periods and real-time line passenger flow obtained in step 3, the number of allocated buses, the planned departure shifts, the planned circle time, the upgoing and downgoing in the intelligent scheduling table obtained in step 5, the initial departure interval obtained in step 6 and the information of vehicle large interval or traffic jam obtained in step 7; and step 9: uploading the real-time departure interval obtained in step 8 to the bus dispatching system and directing the bus vehicles to dispatch in real time.

Optionally, in step 1, the data of boarding cashier and bus dispatching system in a specified time period are acquired for data preprocessing, invalid data and useless fields are eliminated to obtain data, and the obtained data are correlated to obtain su, sp, sc, $C_i$ and $M_n$.

Optionally, in step 2, the passenger flow reverse compensation algorithm includes following specific steps:

A1: calculating the electronic swiping times $$W_t = \sum_{i=1}^{sc} C_i$$

of the bus vehicle numbered as $B_n$ in the line $L_k$ at the stop $S_t$ on the dth day, the electronic swiping times $$V_t = \sum_{n=1}^{BC} W_t$$

of all vehicles in the line $L_k$ at the stop $S_t$ on the dth day, the electronic swiping times $$V_n = \sum_{t=1}^{su+sp} W_t$$

of the bus vehicle numbered as $B_n$ in line $L_k$ at all stops on the dth day, the electronic swiping times $$V_d = \sum_{n=1}^{BC} V_n$$

of all vehicles in the line $L_k$ at all stops on the dth day, the total cash charges $M_n$ of bus vehicle numbered as $B_n$ in the line $L_k$ at all stops on the dth day, total cash charges $$M_d = \sum_{n=1}^{BC} M_n$$

in the line $L_k$ at all stops on the dth day, the number of cash charges $$R_d = \frac{\sum_{n=1}^{BC} M_n}{Y}$$

at all stops in the line $L_k$ on the dth day, and the cashier coefficient $$\lambda_t = \frac{V_t}{V_d} = \frac{\sum_{n=1}^{BC} W_t}{\sum_{n=1}^{BC} V_n}$$

at each stop in the line $L_k$ on the dth day;

A2: calculating cash times $R_t = R_d * \lambda_t$ of the line $L_k$ at the stop $S_t$ on the dth day and the number of boarding passengers $P_t = V_t + R_t$ of the line $L_k$ at the stop $S_t$ on the dth day according to the cashier times $R_d$ and cashier coefficient $\lambda_t$.

Optionally, there are two cases of payment by swiping card. The first case is that the number of card swipes per day with the same card number is even, such as office workers. According to a card swiping for a second boarding by this card number on the same day in the opposite direction of an original line, a boarding card-swiping stop for this time is a drop-off card-swiping stop corresponding to a boarding card-swiping stop for last time, while a boarding card-swiping stop on the original line is also a drop-off card-swiping stop for a second boarding card-swiping, and drop-off card-swiping time=a time span between the boarding stop and the drop-off stop+the time of the boarding stop, thus obtaining the drop-off card-swiping stop and the drop-off card-swiping time.

The second case is that the number of card swipes per day with the same card number are odd. This crowd don't take fixed buses, and only have determined boarding stops, instead of determined drop-off stops. In this case, drop-off stops corresponding to boarding stops conform to an uniform distribution of the first case, and the drop-off stops corresponding to the boarding stops in the second case are obtained according to a percentage distribution mapping of each drop-off stop corresponding to the boarding stop in the first case and drop-off card-swiping time=a time span between boarding stop and drop-off stop+the time of boarding stop; cash-paying crowd and card-paying crowd are evenly distributed and from $V_t$ and $R_t$ obtained in A2, the cash coefficient $$\sigma = \frac{R_t}{V_t}$$

on the dth day is calculated, the number of boarding and drop-off people paying by cash=the number of boarding and drop-off people paying by cashier*$\sigma$, and the time of drop-off stop paid by cash is obtained through the same type of mapping.

Optionally, in step 5, the scheduling optimization algorithm includes following specific steps:

B1: using weighted arithmetic mean respectively on the historical cycle time and historical departure shifts of each vehicle within time periods of the starting time and ending time to obtain the historical average cycle time and historical average shifts for upgoing and downgoing of each line according to the historical operation shift data, combined with the line number, starting time and ending time in the intelligent scheduling table obtained in step 4, where the historical average cycle time is the planned cycle time and the historical average shifts are the planned departure shifts;

B2: predicting the line passenger flow at the execution time of the scheduling table through a machine learning algorithm LightGBM according to the line passenger flow, calculating the passenger flow of each line at the starting time and the ending time in the result of step 4, respectively calculating running times of each vehicle in each time period=(ending time−starting time)/2*the planned cycle time of the upgoing or the downgoing, and the number of allocated buses in each line at the starting time and ending time=the passenger flow in this time period/(single-ride average passenger capacity*the running times of each bus in each time period), where the single-ride average passenger capacity is obtained front the passenger flow data of each line.

Optionally, in step 6, the departure interval calculation algorithm specifically includes following steps:

C1: actual departure shifts in each time period=passenger flow in this time period/single-ride average passenger capacity;

C2: deviation threshold=actual departure shifts/planned departure shifts in each time period. If the deviation threshold is within the normal range, operation time per shift=(ending time−starting time)/actual departure shifts, otherwise, initial departure interval=(ending time−starting time)/2*(actual departure shifts+planned departure shifts);

C3: predicting the cross-section passenger flow of the at execution time of the scheduling table through the machine learning algorithm LightGBM according to the cross-section passenger flow, with the initial congestion coefficient=the maximum cross-section passenger flow/number of passengers in each time period at the execution time, adjustment time of congestion departure interval=the actual departure interval*congestion coefficient*congestion adjustment parameters, where the congestion adjustment parameters are set according to the actual situation of buses;

C4: when the congestion coefficient>normal threshold coefficient, initial departure interval time=operation time per shift−adjustment time of congestion departure interval, and when the congestion coefficient<normal threshold coefficient, initial departure interval time=operation time per shift+adjustment time of congestion departure interval, where the normal threshold coefficient is set according to the actual situation of buses.

Optionally, in step 8, the real-time departure interval adjustment algorithm specifically includes following steps:

D1: calculating the congestion coefficient=the maximum cross-section passenger flow/number of passengers at the real-time stop, the adjustment time of congestion departure interval=initial departure interval*congestion coefficient*congestion adjustment parameters, where initial values of the congestion adjustment parameters are set according to the actual situation of buses; the large interval or traffic jam coefficient=the maximum distance between two buses/the normal distance threshold, the large interval or traffic jam adjustment time=initial departure interval*large interval or traffic jam coefficient*large interval or traffic jam adjustment parameters, where initial values of large interval or traffic jam adjustment parameters are set based on the actual situations of buses;

D2: when the congestion coefficient>the normal threshold coefficient, with the normal threshold coefficient set according to the actual situation of buses, adjusted departure interval time=initial departure interval-adjustment time of congestion departure interval; when the congestion coefficient<the normal threshold coefficient, the adjusted departure interval time=initial departure interval+adjustment time of congestion departure interval;

D3: the large interval or traffic jam coefficient>the normal threshold coefficient, with the normal threshold coefficient set according to the actual situation of buses, the adjusted departure interval time=initial departure interval-large interval or traffic jam adjustment time; when the congestion coefficient<the normal threshold coefficient, the adjusted departure interval time=initial departure interval+large interval or traffic jam adjustment time;

D4: calculating whether the congestion coefficient reaches the normal threshold every 1 minute, and training the congestion adjustment parameters, large interval or traffic jam adjustment parameters by using a deep neural network algorithm until optimal congestion adjustment parameters, large interval or traffic jam adjustment parameters are obtained;

D5: using the congestion adjustment parameters, the large interval or the traffic jam adjustment parameters obtained in D4 to update the congestion adjustment parameters, the large interval or the traffic jam adjustment parameters in D1 to obtain a final real-time departure interval.

The application has the beneficial effects that the application has high commercial and practical value, and realizes the intelligent scheduling table generation method based on bus multi-source data analysis. The method fully utilizes bus multi-source data, fully taps value of the bus multi-source data, supports the business scenario of only boarding the bus and swiping the card, and further updates the scheduling table in real time according to the running situation of each bus line, so the method has high popularization value in the field of intelligent bus, and provides efficient and intelligent management means for managers.

BRIEF DESCRIPTION OF THE DRAWINGS

In order to more clearly explain the embodiments of the present application or the technical solutions in the prior art, the following will briefly introduce the drawings that need to be used in the description of the embodiments or the prior art. Obviously, the drawings in the following description are only some embodiments of the present application. For those of ordinary skill in the art, other drawings may be obtained according to these drawings without any creative labor.

FIG. 5 is a flow chart of a real-time departure interval adjustment algorithm of the present invention.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In the description of the present application, it should be noted that the directions or positional relationships indicated by the terms "center", "upper", "lower", "left", "right", "vertical", "horizontal", "inside" and "outside" are based on the directions or positional relationships shown in the drawings, only for the convenience of describing the present application and simplifying the description, not indicating or implying that the referred devices or elements must have a specific orientation, be constructed and operated in a specific orientation, and therefore should not be construed as limiting the invention. In addition, the terms "first", "second", "third" and "fourth" are only used for descriptive purposes, and cannot be understood as indicating or implying relative importance.

In the description of the present application, it should be noted that unless otherwise specified and limited, the terms "installed", "communicated" and "connected" should be understood in a broad sense. For example, they can be fixedly connected, detachably connected or integrally connected, can be mechanically connected or electrically connected, can be directly connected or indirectly connected through an intermediate medium, or it can be the internal communication of two elements. For those of ordinary skill in the art, the specific meanings of the above terms in the present application can be understood in specific situations.

Figure 1:
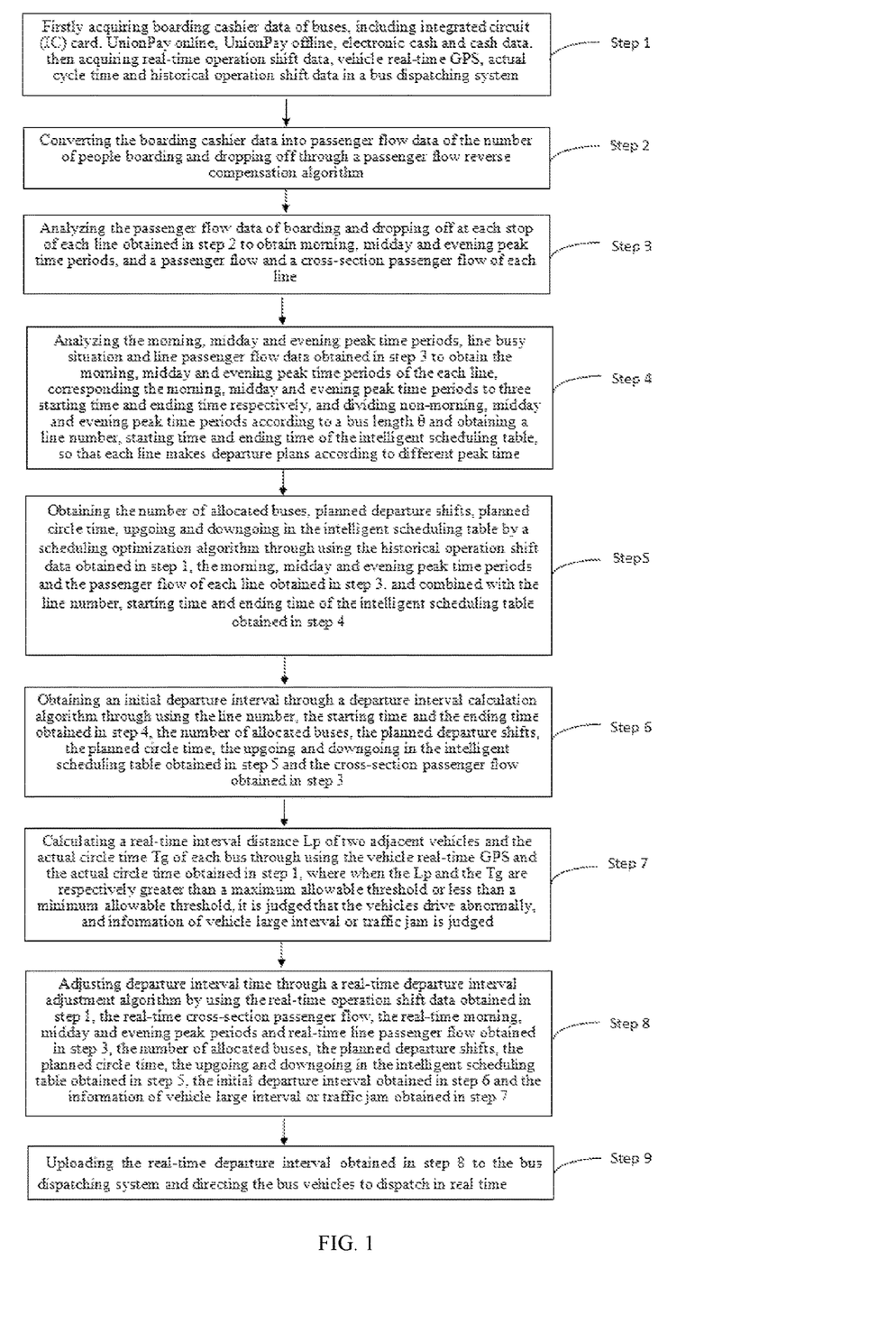
FIG. 1 is a flow chart of an intelligent scheduling table generation method based on multi-source data analysis of buses according to the present application.
Figure 2:
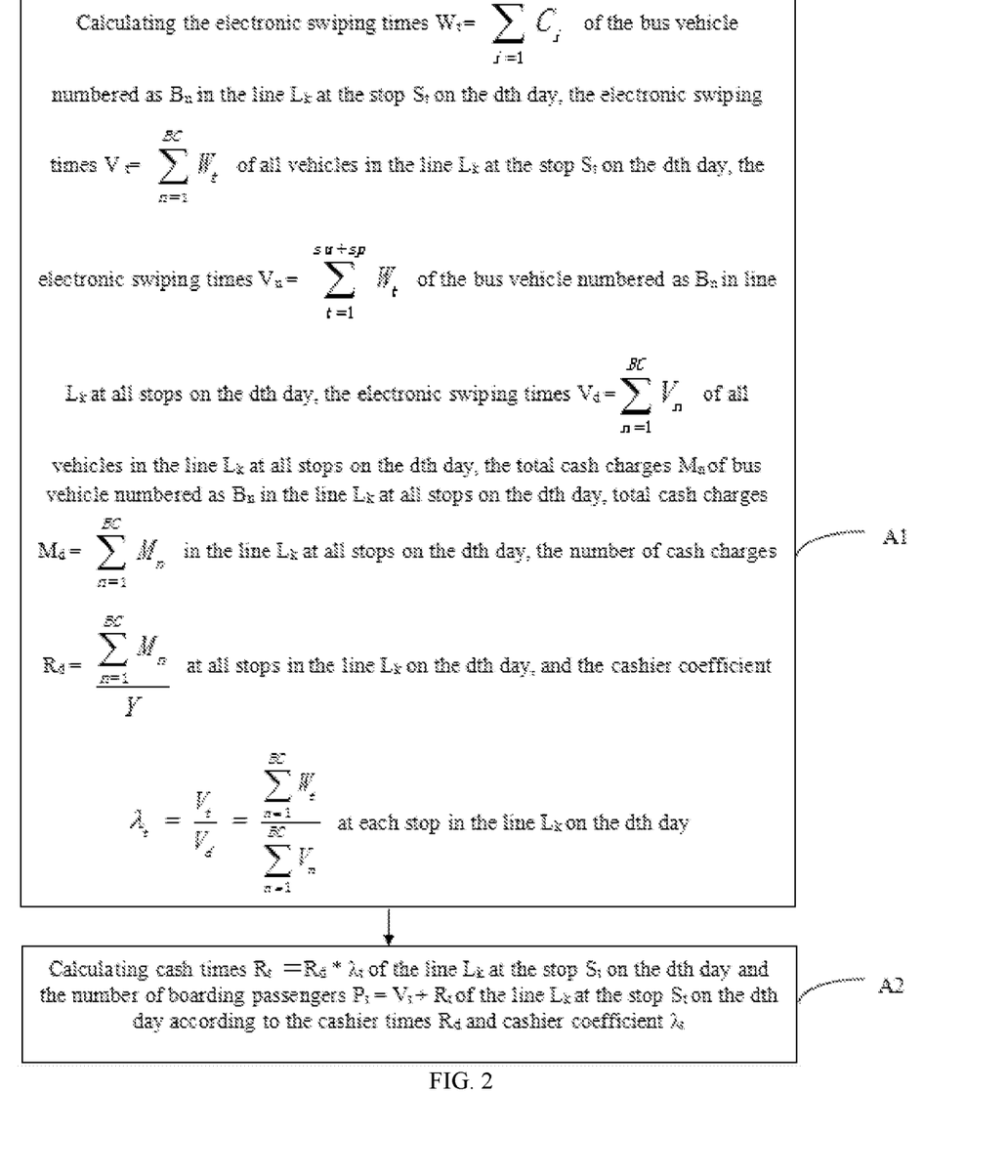
FIG. 2 is a flow chart of a passenger flow reverse compensation algorithm of the present invention.

This embodiment provides an intelligent scheduling table generation method based on multi-source data analysis of buses, including following steps:

defining LC as the number of all lines owned by a bus company, representing a serial number of one of lines with $L_k$, then $1 \leq k \leq LC$, representing the number of all vehicles in the line $L_k$ by BC, representing a serial number of one of bus vehicles in the line $L_k$ by $B_n$, then $1 \leq n \leq BC$, representing upgoing and downgoing of lines by ud, wherein ud is 0 for downgoing, 1 for upgoing, and representing a serial number of one of bus stops in the line $L_k$ by $S_t$, wherein a serial number range of up-going stops is $1 \leq t \leq su$, su is the number of all up-going stops in the line $L_k$, sp is the number of all down-going stops in the line $L_k$, a serial number range of down-going stops is $su+1 \leq t \leq su+sp$; indicating the dth day from the current day by d, $1 \leq d \leq D$, and indicating the maximum number of days with D from a selected time range to the current day; recording electronic swiping times of one of bus vehicles numbered as $B_n$ in the line $L_k$ passing though the stop $S_t$ in ith shift on the dth day as Cr, the number of shifts of this bus vehicle as sc, electronic swiping times of the bus vehicle numbered as $B_n$ in the line $L_k$ at the stop $S_t$ on the dth day as $W_t$, electronic swiping times of all vehicles in the line $L_k$ at the stop $S_t$ on the dth day as $V_t$, electronic swiping times of the bus vehicle numbered as $B_n$ in the line $L_k$ at all stops on the dth day as $V_n$, electronic swiping times of all vehicles in the line $L_k$ at all stops on the dth day as $V_d$, total cash charge of the bus vehicle numbered as $B_n$ in the line $L_k$ at all stops on the dth day as $M_n$, total cash charge of all stops in the line $L_k$ on the dth day with $M_d$, and the ticket price of the line $L_k$ as Y yuan, the number of cash charges at all stops in the line $L_k$ on the dth day as $R_d$, cash times at the stop $S_t$ of the line $L_k$ on the dth day as $R_t$, a cashier coefficient at each stop of the line $L_k$ on the dth day as $\lambda_t$, and the number of passengers boarding at the stop $S_t$ of the line $L_k$ on the dth day as $P_t$;

as shown in FIG. 1, step 1: firstly acquiring boarding cashier data of buses, including integrated circuit (IC) card, UnionPay online, UnionPay offline, electronic cash and cash data, then acquiring real-time operation shift data, vehicle real-time GPS, actual cycle time and historical operation shift data in a bus dispatching system;

step 2: converting the boarding cashier data into passenger flow data of the number of people boarding and dropping off through a passenger flow reverse compensation algorithm, where the passenger flow reverse compensation algorithm as shown in FIG. 2 includes following steps:

A1: calculating the electronic swiping times $$W_t = \sum_{i=1}^{sc} C_i$$

of the bus vehicle numbered as $B_n$ in the line $L_k$ at the stop $S_t$ on the dth day, the electronic swiping times $$V_t = \sum_{n=1}^{BC} W_t$$

of all vehicles in the line $L_k$ at the stop $S_t$ on the dth day, the electronic swiping times $$V_n = \sum_{t=1}^{su+sp} W_t$$

of the bus vehicle numbered as $B_n$ in line $L_k$ at all stops on the dth day, the electronic swiping times $$V_d = \sum_{n=1}^{BC} V_n$$

of all vehicles in the line $L_k$ at all stops on the dth day, the total cash charges $M_n$ of bus vehicle numbered as $B_n$ in the line $L_k$ at all stops on the dth day, total cash charges $$M_d = \sum_{n=1}^{BC} M_n$$

in the line $L_k$ at all stops on the dth day, the number of cash charges $$R_d = \frac{\sum_{n=1}^{BC} M_n}{Y}$$

at all stops in the line $L_k$ on the dth day, and the cashier coefficient $$\lambda_t = \frac{V_t}{V_d} = \frac{\sum_{n=1}^{BC} W_t}{\sum_{n=1}^{BC} V_n}$$

at each stop in the line $L_k$ on the dth day;

A2: calculating cash times $R_t = R_d * \lambda_t$ of the line $L_k$ at the stop $S_t$ on the dth day and the number of boarding passengers $P_t = V_t + R_t$ of the line $L_k$ at the stop $S_t$ on the dth day according to the cashier times $R_d$ and cashier coefficient $\lambda_t$.

There are two cases of payment by swiping card. The first case is that the number of card swipes per day with the same card number is even, such as office workers. According to a card swiping for a second boarding by this card number on the same day in the opposite direction of an original line, a boarding card-swiping stop for this time is a drop-off card-swiping stop corresponding to a boarding card-swiping stop for last time, while a boarding card-swiping stop on the original line is also a drop-off card-swiping stop for a second boarding card-swiping, and drop-off card-swiping time=a time span between the boarding stop and the drop-off stop+the time of the boarding stop, thus obtaining the drop-off card-swiping stop and the drop-off card-swiping time.

The second case is that the number of card swipes per day with the same card number are odd. This crowd don't take fixed buses, and only have determined boarding stops, instead of determined drop-off stops. In this case, the drop-off stop corresponding to the boarding stop conforms to the uniform distribution of the first case, and the drop-off stop corresponding to the boarding stop in the second case is obtained by mapping according to the percentage distribution of each drop-off stop corresponding to the boarding stop in the first case. Drop-off card-swiping time=the time span between boarding stop and drop-off stop+the time of boarding stop, and the cash-paying crowd and the card-paying crowd are evenly distributed. From $V_t$ and $R_t$ obtained in A2, the cash coefficient $$\sigma = \frac{R_t}{V_t}$$

on the dth day is calculated. The number of boarding and drop-off people paying by cash=the number of boarding and drop-off people paying by cashier*$\sigma$, and the time of drop-off stop paid by cash is obtained through the same type of mapping.

Figure 3:
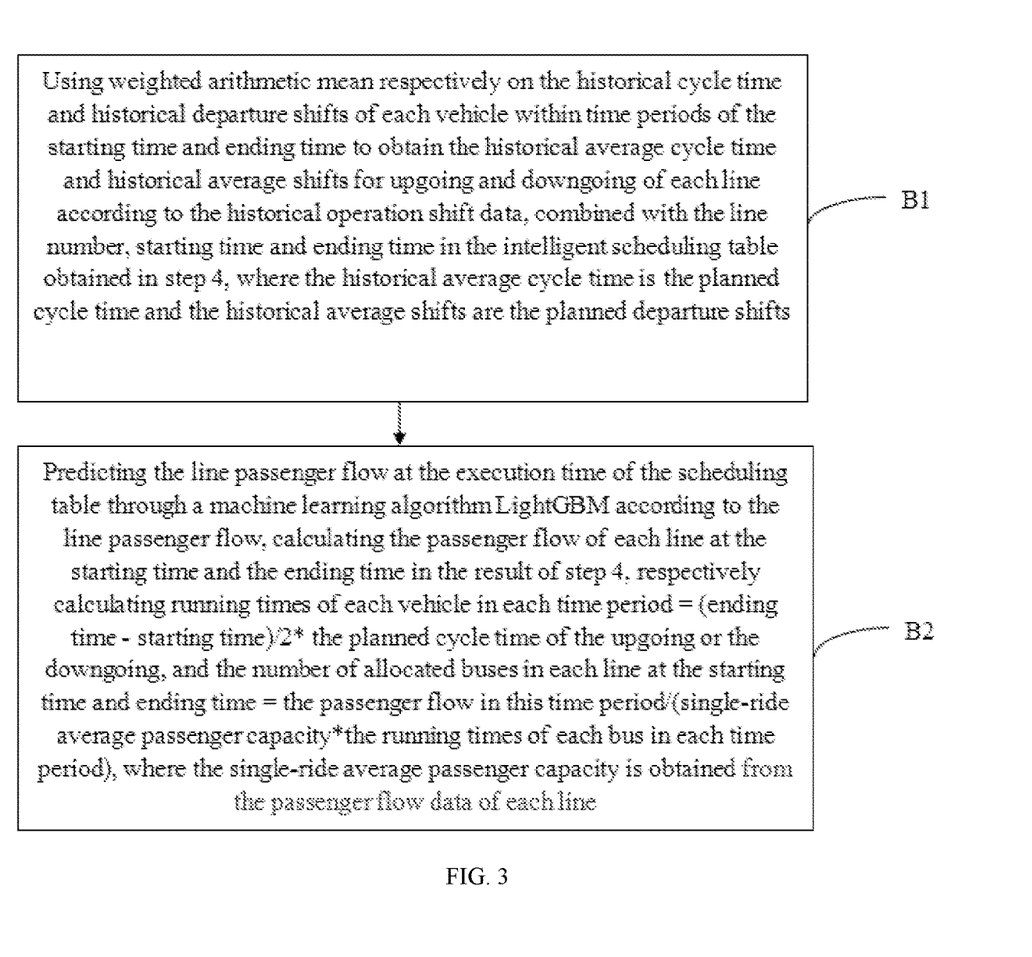
FIG. 3 is a flow chart of a scheduling optimization algorithm of the present invention.
Figure 4:
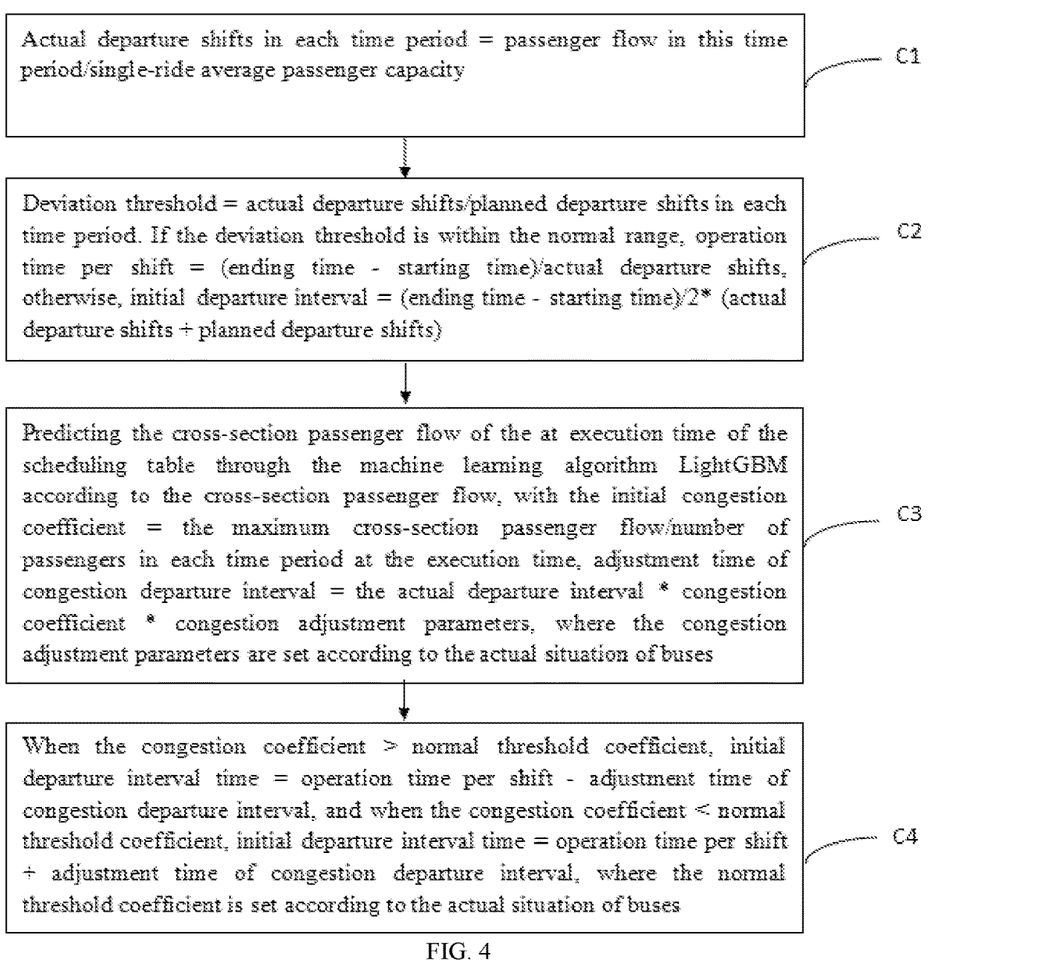
FIG. 4 is a flow chart of a departure interval calculation algorithm of the present invention.

Step 3: analyzing the passenger flow data of boarding and dropping off at each stop of each line obtained in step 2 to obtain morning, midday and evening peak time periods, and a passenger flow and a cross-section passenger flow of each line;

step 4: analyzing the morning, midday and evening peak time periods, line busy situation and line passenger flow data obtained in step 3 to obtain the morning, midday and evening peak time periods of the each line, corresponding the morning, midday and evening peak time periods to three starting time and ending time respectively, and dividing non-morning, midday and evening peak time periods according to a bus length $\theta$ and obtaining a line number, starting time and ending time of the intelligent scheduling table, so that each line makes departure plans according to different peak time;

step 5: obtaining the number of allocated buses, planned departure shifts, planned circle time, upgoing and downgoing in the intelligent scheduling table by a scheduling optimization algorithm through using the historical operation shift data obtained in step 1, the morning, midday and evening peak time periods and the passenger flow of each line obtained in step 3, and combined with the line number, starting time and ending time of the intelligent scheduling table obtained in step 4, where the scheduling optimization algorithm as shown in FIG. 3 includes following specific steps:

B1: using weighted arithmetic mean respectively on the historical cycle time and historical departure shifts of each vehicle within time periods of the starting time and ending time to obtain the historical average cycle time and historical average shifts of upgoing and downgoing of each line according to the historical operation shift data, combined with the line number, starting time and ending time in the intelligent scheduling table obtained in step 4, where the historical average cycle time is the planned cycle time and the historical average shifts are the planned departure shift;

B2: predicting the line passenger flow at the execution time of the scheduling table through a machine learning algorithm LightGBM according to the line passenger flow, calculating the passenger flow of each line at the starting time and the ending time in the result of step 4, respectively calculating running times of each vehicle in each time period=(ending time−starting time)/2*the planned cycle time of the upgoing or the downgoing, and the number of allocated buses in each line at the starting time and ending time=the passenger flow in this time period/(single-ride average passenger capacity*the running times of each bus in each time period), where the single-ride average passenger capacity is obtained from the passenger flow data of each line;

step 6: obtaining an initial departure interval through a departure interval calculation algorithm through using the line number, the starting time and the ending time obtained in step 4, the number of allocated buses, the planned departure shifts, the planned circle time, the upgoing and downgoing in the intelligent scheduling table obtained in step 5 and the cross-section passenger flow obtained in step 3, where the departure interval calculation algorithm as shown in FIG. 4 includes following steps:

C1: actual departure shifts in each time period=passenger flow in this time period/single-ride average passenger capacity;

C2: deviation threshold=actual departure shifts/planned departure shifts in each time period. If the deviation threshold is within the normal range, operation time per shift=(ending time−starting time)/actual departure shifts, otherwise, initial departure interval=(ending time−starting time)/2*(actual departure shifts+planned departure shifts);

C3: predicting the cross-section passenger flow of the at execution time of the scheduling table through the machine learning algorithm LightGBM according to the cross-section passenger flow, with the initial congestion coefficient=the maximum cross-section passenger flow/number of passengers in each time period at the execution time, adjustment time of congestion departure interval=the actual departure interval*congestion coefficient*congestion adjustment parameters, where the congestion adjustment parameters are set according to the actual situation of buses;

C4: when the congestion coefficient>normal threshold coefficient, initial departure interval time=operation time per shift−adjustment time of congestion departure interval, and when the congestion coefficient<normal threshold coefficient, initial departure interval time=operation time per shift+adjustment time of congestion departure interval, where the normal threshold coefficient is set according to the actual situation of buses.

Step 7: calculating a real-time interval distance Lp of two adjacent vehicles and the actual circle time Tg of each bus through using the vehicle real-time GPS and the actual circle time obtained in step 1, where when the Lp and the Tg are respectively greater than a maximum allowable threshold or less than a minimum allowable threshold, it is judged that the vehicles drive abnormally, and information of vehicle large interval or traffic jam is judged;

step 8: adjusting departure interval time through a real-time departure interval adjustment algorithm by using the real-time operation shift data obtained in step 1, the real-time cross-section passenger flow, the real-time morning, midday and evening peak periods and real-time line passenger flow obtained in step 3, the number of allocated buses, the planned departure shifts, the planned circle time, the upgoing and downgoing in the intelligent scheduling table obtained in step 5, the initial departure interval obtained in step 6 and the information of vehicle large interval or traffic jam obtained in step 7, where the real-time departure interval adjustment algorithm as shown in FIG. 5 specifically includes following steps:

D1: calculating the congestion coefficient=the maximum cross-section passenger flow/number of passengers at the real-time stop, the adjustment time of congestion departure interval=initial departure interval*congestion coefficient*congestion adjustment parameters, where initial values of the congestion adjustment parameters are set according to the actual situation of buses; the large interval or traffic jam coefficient=the maximum distance between two buses/the normal distance threshold, the large interval or traffic jam adjustment time=initial departure interval*large interval or traffic jam coefficient*large interval or traffic jam adjustment parameters, where initial values of large interval or traffic jam adjustment parameters are set based on the actual situations of buses;

D2: when the congestion coefficient>the normal threshold coefficient, with the normal threshold coefficient set according to the actual situation of buses, adjusted departure interval time=initial departure interval−adjustment time of congestion departure interval; when the congestion coefficient<the normal threshold coefficient, the adjusted departure interval time=initial departure interval+adjustment time of congestion departure interval;

D3: the large interval or traffic jam coefficient>the normal threshold coefficient, with the normal threshold coefficient set according to the actual situation of buses, the adjusted departure interval time=initial departure interval−large interval or traffic jam adjustment time; when the congestion coefficient<the normal threshold coefficient, the adjusted departure interval time=initial departure interval+large interval or traffic jam adjustment time;

D4: calculating whether the congestion coefficient reaches the normal threshold every 1 minute, and training the congestion adjustment parameters, large interval or traffic jam adjustment parameters by using a deep neural network algorithm until optimal congestion adjustment parameters, large interval or traffic jam adjustment parameters are obtained;

D5: using the congestion adjustment parameters, the large interval or the traffic jam adjustment parameters obtained in D4 to update the congestion adjustment parameters, the large interval or the traffic jam adjustment parameters in D1 to obtain a final real-time departure interval;

step 9: uploading the real-time departure interval obtained in step 8 to the bus dispatching system and directing the bus vehicles to dispatch in real time.

The intelligent scheduling algorithm integrates the above-mentioned passenger flow reverse compensation algorithm, scheduling optimization algorithm, departure interval calculation algorithm and real-time departure interval adjustment algorithm. By accessing multi-source bus data, the intelligent scheduling algorithm is used to obtain the intelligent scheduling table data and provide the intelligent scheduling table data to the scheduling system to guide the dispatching of vehicles. According to the real-time situation of vehicle dispatching, the intelligent scheduling table is adjusted, dispatching operation data generated by the dispatching system also provides data sources for scheduling table generation, and the optimal intelligent scheduling table is achieved through iterative optimization, as shown in the business flow chart of intelligent scheduling table in FIG. 2.

In accordance with one aspect of the disclosure, a method for guiding the dispatching of vehicles is provided, which generates an intelligent scheduling table based on multi-source data analysis of buses, wherein the method comprises following steps:

defining LC as the number of all lines owned by a bus company, representing a serial number of one of lines with $L_k$, then $1 \leq k \leq LC$, representing the number of all vehicles in the line $L_k$ by BC, representing a serial number of one of bus vehicles in the line $L_k$ by $B_n$, then $1 \leq n \leq BC$, representing upgoing and downgoing of lines by ud, wherein ud is 0 for downgoing, 1 for upgoing, and representing a serial number of one of bus stops in the line $L_k$ by $S_t$, wherein a serial number range of up-going stops is $1 \leq t \leq su$, su is the number of all up-going stops in the line $L_k$, sp is the number of all down-going stops in the line $L_k$, a serial number range of down-going stops is $su+1 \leq t \leq su+sp$; indicating the dth day from the current day by d, $1 \leq d \leq D$, and indicating the maximum number of days with D from a selected time range to the current day; recording electronic swiping times of one of bus vehicles numbered as $B_n$ in the line $L_k$ passing though the stop $S_t$ in ith shift on the dth day as $C_i$, the number of shifts of this bus vehicle as sc, electronic swiping times of the bus vehicle numbered as $B_n$ in the line $L_k$ at the stop $S_t$ on the dth day as $W_t$, electronic swiping times of all vehicles in the line $L_k$ at the stop $S_t$ on the dth day as $V_t$, electronic swiping times of the bus vehicle numbered as $B_n$ in the line $L_k$ at all stops on the dth day as $V_n$, electronic swiping times of all vehicles in the line $L_k$ at all stops on the dth day as $V_d$, total cash charge of the bus vehicle numbered as $B_n$ in the line $L_k$ at all stops on the dth day as $M_n$, total cash charge of all stops in the line $L_k$ on the dth day with $M_d$, and the ticket price of the line $L_k$ as Y yuan, the number of cash charges at all stops in the line $L_k$ on the dth day as $R_d$, cash times at the stop $S_t$ of the line $L_k$ on the dth day as $R_t$, a cashier coefficient at each stop of the line $L_k$ on the dth day as $\lambda_t$, and the number of passengers boarding at the stop $S_t$ of the line $L_k$ on the dth day as $P_t$;

step 1
firstly acquiring boarding cashier data of buses, including is card, UnionPay online, UnionPay offline, electronic cash and cash data, then acquiring real-time operation shift data, vehicle real-time GPS, actual cycle time and historical operation shift data in a bus dispatching system;

step 2
converting the boarding cashier data into passenger flow data of the number of people boarding and dropping off through a passenger flow reverse compensation algorithm;

step 3
analyzing the passenger flow data of boarding and dropping off at each stop of each line obtained in step 2 to obtain morning, midday and evening peak time periods, and a passenger flow and a cross-section passenger flow of each line;

step 4
analyzing the morning, midday and evening peak time periods, line busy situation and line passenger flow data obtained in step 3 to obtain the morning, midday and evening peak time periods of the each line, corresponding the morning, midday and evening peak time periods to three starting time and ending time respectively, and dividing non-morning, midday and evening peak time periods according to a bus time length θ and obtaining a line number, starting time and ending time of the intelligent scheduling table, so that each line makes departure plans according to different peak time;

step 5
obtaining the number of allocated buses, planned departure shifts, planned circle time, upgoing and downgoing in the intelligent scheduling table by a scheduling optimization algorithm through using the historical operation shift data obtained in step 1, the morning, midday and evening peak time periods and the passenger flow of each line obtained in step 3, combined with the line number, starting time and ending time of the intelligent scheduling table obtained in step 4;

step 6
obtaining an initial departure interval through a departure interval calculation algorithm through using the line number, the starting time and the ending time obtained in step 4, the number of allocated buses, the planned departure shifts, the planned circle time, the upgoing and downgoing in the intelligent scheduling table obtained in step 5 and the cross-section passenger flow obtained in step 3;

step 7
calculating a real-time interval distance Lp of two adjacent vehicles and actual circle time Tg of each bus through using the vehicle real-time GPS and the actual circle time obtained in step 1, wherein when the Lp and the Tg are respectively greater than a maximum allowable threshold or less than a minimum allowable threshold, it is judged that the vehicles drive abnormally, and information of vehicle large interval or traffic jam is judged;

step 8
adjusting departure interval time through a real-time departure interval adjustment algorithm by using the real-time operation shift data obtained in step 1, the real-time cross-section passenger flow, the real-time morning, midday and evening peak periods and real-time line passenger flow obtained in step 3, the number of allocated buses, the planned departure shifts, the planned circle time, the upgoing and downgoing in the intelligent scheduling table obtained in step 5, the initial departure interval obtained in step 6 and the information of vehicle large interval or traffic jam obtained in step 7; and step 9
uploading the real-time departure interval obtained in step 8 to the bus dispatching system and directing the bus vehicles to dispatch in real time;

wherein in step 2, the passenger flow reverse compensation algorithm comprises following specific steps:

A1: calculating the electronic swiping times $$W_t = \sum_{i=1}^{SC} C_i$$

of the bus vehicle numbered as $B_n$ in the line $L_k$ at the stop $S_t$ on the dth day, the electronic swiping times $$V_t = \sum_{n=1}^{BC} W_t$$

of all vehicles in the line $L_k$ at the stop $S_t$ on the dth day, the electronic swiping times $$V_n = \sum_{t=1}^{su+sp} W_t$$

of the bus vehicle numbered as $B_n$ in line $L_k$ at all stops on the dth day, the electronic swiping times $$V_d = \sum_{n=1}^{BC} V_n$$

of all vehicles in the line $L_k$ at all stops on the dth day, the total cash charges $M_n$ of bus vehicle numbered as $B_n$ in the line $L_k$ at all stops on the dth day, total cash charges $$M_d = \sum_{n=1}^{BC} M_n$$

in the line $L_k$ at all stops on the dth day, the number of cash charges $$R_d = \frac{\sum_{n=1}^{BC} M_n}{Y}$$

at all stops in the line $L_k$ on the dth day, and the cashier coefficient $$\lambda_t = \frac{V_t}{V_d} = \frac{\sum_{n=1}^{BC} W_t}{\sum_{n=1}^{BC} V_n}$$

at each stop in the line $L_k$ on the dth day;

A2: calculating cash times $R_t = R_d * \lambda_t$ of the line $L_k$ at the stop $S_t$ on the dth day and the number of boarding passengers $P_t = V_t + R_t$ of the line $L_k$ at the stop $S_t$ on the dth day according to the cashier times $R_d$ and cashier coefficient $\lambda_t$;

in step 5, the scheduling optimization algorithm comprises following specific steps:

B1: using weighted arithmetic mean respectively on the historical cycle time and historical departure shifts of each vehicle within time periods of the starting time and ending time to obtain the historical average cycle time and historical average shifts for upgoing and downgoing of each line according to the historical operation shift data, combined with the line number, starting time and ending time in the intelligent scheduling table obtained in step 4, wherein the historical average cycle time is the planned cycle time and the historical average shifts are the planned departure shifts;

B2: predicting the line passenger flow at the execution time of the scheduling table through a machine learning algorithm LightGBM according to the line passenger flow, calculating the passenger flow of each line at the starting time and the ending time in the result of step 4, respectively calculating running times of each vehicle in each time period=(ending time−starting time)/2*the planned cycle time of the upgoing or the downgoing, and the number of allocated buses in each line at the starting time and ending time=the passenger flow in this time period/(single-ride average passenger capacity*running times of each bus in each time period), wherein the single-ride average passenger capacity is obtained from the passenger flow data of each line;

in step 6, the departure interval calculation algorithm specifically comprises following specific steps:

C1: actual departure shifts in each time period=passenger flow in this time period/single-ride average passenger capacity;

C2: deviation threshold=actual departure shifts/planned departure shifts in each time period, wherein if the deviation threshold is within the normal range, operation time per shift=(ending time−starting time)/actual departure shifts, otherwise, initial departure interval= (ending time−starting time)/2*(actual departure shifts+ planned departure shifts);

C3: predicting the cross-section passenger flow of the at execution time of the scheduling table through the machine learning algorithm LightGBM according to the cross-section passenger flow, with the initial congestion coefficient=the maximum cross-section passenger flow/number of passengers in each time period at the execution time, adjustment time of congestion departure interval=actual departure interval*congestion coefficient*congestion adjustment parameters, wherein the congestion adjustment parameters are set according to the actual situation of buses;

C4: when the congestion coefficient>normal threshold coefficient, initial departure interval time=operation time per shift−adjustment time of congestion departure interval, and when the congestion coefficient<normal threshold coefficient, initial departure interval time=operation time per shift+adjustment time of congestion departure interval, wherein the normal threshold coefficient is set according to the actual situation of buses;

in step 8, the real-time departure interval adjustment algorithm specifically comprises following steps:

D1: calculating the congestion coefficient=the maximum cross-section passenger flow/number of passengers at the real-time stop, the adjustment time of congestion departure interval=initial departure interval*congestion coefficient*congestion adjustment parameters, where initial values of the congestion adjustment parameters are set according to the actual situation of buses; the large interval or traffic jam coefficient=the maximum distance between two buses/the normal distance threshold, the large interval or traffic jam adjustment time=initial departure interval*large interval or traffic jam coefficient*large interval or traffic jam adjustment parameters, wherein initial values of large interval or traffic jam adjustment parameters are set based on the actual situations of buses;

D2: when the congestion coefficient>the normal threshold coefficient, with the normal threshold coefficient set according to the actual situation of buses, adjusted departure interval time=initial departure interval-adjustment time of congestion departure interval; when the congestion coefficient<the normal threshold coefficient, the adjusted departure interval time=initial departure interval+adjustment time of congestion departure interval;

D3: the large interval or traffic jam coefficient>the normal threshold coefficient, with the normal threshold coefficient set according to the actual situation of buses, the adjusted departure interval time=initial departure interval-large interval or traffic jam adjustment time; when the congestion coefficient<the normal threshold coefficient, the adjusted departure interval time=initial departure interval+large interval or traffic jam adjustment time;

D4: calculating whether the congestion coefficient reaches the normal threshold every 1 minute, and training the congestion adjustment parameters, large interval or traffic jam adjustment parameters by using a deep neural network algorithm until optimal congestion adjustment parameters, large interval or traffic jam adjustment parameters are obtained;

D5: using the congestion adjustment parameters, the large interval or the traffic jam adjustment parameters obtained in D4 to update the congestion adjustment parameters, the large interval or the traffic jam adjustment parameters in D1 to obtain a final real-time departure interval.

The above is only a preferred embodiment of the present invention, and it is not intended to limit the present invention. Any modifications, equivalents, improvements, etc. made within the spirit and principle of the present invention should be included in the scope of protection of the present invention.

What is claimed is:

1. A method for guiding the dispatching of vehicles, which generates an intelligent scheduling table based on multi-source data analysis of buses, the method comprising following steps:

defining LC as the number of all lines owned by a bus company, representing a serial number of one of lines with $L_k$, then $1 \le k \le LC$, representing the number of all vehicles in the line $L_k$ by BC, representing a serial number of one of bus vehicles in the line $L_k$ by $B_n$, then $1 \le n \le BC$, representing upgoing and downgoing of lines by ud, wherein ud is 0 for downgoing, 1 for upgoing, and representing a serial number of one of bus stops in the line $L_k$ by $S_t$, wherein a serial number range of up-going stops is $1 \le t \le su$, su is the number of all up-going stops in the line $L_k$, sp is the number of all down-going stops in the line $L_k$, a serial number range of down-going stops is $su+1 \le t \le su+sp$; indicating the dth day from the current day by d, $1 \le d \le D$, and indicating the maximum number of days with D from a selected time range to the current day; recording electronic swiping times of one of bus vehicles numbered as $B_n$ in the line $L_k$ passing though the stop $S_t$ in ith shift on the dth day as $C_i$, the number of shifts of this bus vehicle as sc, electronic swiping times of the bus vehicle numbered as $B_n$ in the line $L_k$ at the stop $S_t$ on the dth day as $W_t$, electronic swiping times of all vehicles in the line $L_k$ at the stop $S_t$ on the dth day as $V_t$, electronic swiping times of the bus vehicle numbered as $B_n$ in the line $L_k$ at all stops on the dth day as $V_n$, electronic swiping times of all vehicles in the line $L_k$ at all stops on the dth day as $V_d$, total cash charge of the bus vehicle numbered as $B_n$ in the line $L_k$ at all stops on the dth day as $M_n$, total cash charge of all stops in the line $L_k$ on the dth day with $M_d$, and the ticket price of the line $L_k$ as Y yuan, the number of cash charges at all stops in the line $L_k$ on the dth day as $R_d$, cash times at the stop $S_t$ of the line $L_k$ on the dth day as $R_t$, a cashier coefficient at each stop of the line $L_k$ on the dth day as $\lambda_t$, and the number of passengers boarding at the stop $S_t$ of the line $L_k$ on the dth day as $P_t$;

step 1 firstly acquiring boarding cashier data of buses, including is card, UnionPay online, UnionPay offline, electronic cash and cash data, then acquiring real-time operation shift data, vehicle real-time GPS, actual cycle time and historical operation shift data in a bus dispatching system;

step 2 converting the boarding cashier data into passenger flow data of the number of people boarding and dropping off through a passenger flow reverse compensation algorithm;

step 3 analyzing the passenger flow data of boarding and dropping off at each stop of each line obtained in step 2 to obtain morning, midday and evening peak time periods, and a passenger flow and a cross-section passenger flow of each line;

step 4 analyzing the morning, midday and evening peak time periods, line busy situation and line passenger flow data obtained in step 3 to obtain the morning, midday and evening peak time periods of the each line, corresponding the morning, midday and evening peak time periods to three starting time and ending time respectively, and dividing non-morning, midday and evening peak time periods according to a bus time length θ and obtaining a line number, starting time and ending time of the intelligent scheduling table, so that each line makes departure plans according to different peak time;

step 5 obtaining the number of allocated buses, planned departure shifts, planned circle time, upgoing and downgoing in the intelligent scheduling table by a scheduling optimization algorithm through using the historical operation shift data obtained in step 1, the morning, midday and evening peak time periods and the passenger flow of each line obtained in step 3, combined with the line number, starting time and ending time of the intelligent scheduling table obtained in step 4;

step 6 obtaining an initial departure interval through a departure interval calculation algorithm through using the line number, the starting time and the ending time obtained in step 4, the number of allocated buses, the planned departure shifts, the planned circle time, the upgoing and downgoing in the intelligent scheduling table obtained in step 5 and the cross-section passenger flow obtained in step 3;

step 7 calculating a real-time interval distance Lp of two adjacent vehicles and actual circle time Tg of each bus through using the vehicle real-time GPS and the actual circle time obtained in step 1, wherein when the Lp and the Tg are respectively greater than a maximum allowable threshold or less than a minimum allowable threshold, it is judged that the vehicles drive abnormally, and information of vehicle large interval or traffic jam is judged;

step 8 adjusting departure interval time through a real-time departure interval adjustment algorithm by using the real-time operation shift data obtained in step 1, the real-time cross-section passenger flow, the real-time morning, midday and evening peak periods and real-time line passenger flow obtained in step 3, the number of allocated buses, the planned departure shifts, the planned circle time, the upgoing and downgoing in the intelligent scheduling table obtained in step 5, the initial departure interval obtained in step 6 and the information of vehicle large interval or traffic jam obtained in step 7; and step 9 uploading the real-time departure interval obtained in step 8 to the bus dispatching system and directing the bus vehicles to dispatch in real time;

wherein in step 2, the passenger flow reverse compensation algorithm comprises following specific steps:

A1: calculating the electronic swiping times $$W_t = \sum_{i=1}^{SC} C_i$$

of the bus vehicle numbered as $B_n$ in the line $L_k$ at the stop $S_t$ on the dth day, the electronic swiping times $$V_t = \sum_{n=1}^{BC} W_t$$

of all vehicles in the line $L_k$ at the stop $S_t$ on the dth day, the electronic swiping times $$V_n = \sum_{t=1}^{su+sp} W_t$$

of the bus vehicle numbered as $B_n$ in line $L_k$ at all stops on the dth day, the electronic swiping times $$V_d = \sum_{n=1}^{BC} V_n$$

of all vehicles in the line $L_k$ at all stops on the dth day, the total cash charges $M_n$ of bus vehicle numbered as $B_n$ in the line $L_k$ at all stops on the dth day, total cash charges $$M_d = \sum_{n=1}^{BD} M_n$$

in the line $L_k$ at all stops on the dth day, the number of cash charges $$R_d = \frac{\sum_{n=1}^{BC} M_n}{Y}$$

at all stops in the line $L_k$ on the dth day, and the cashier coefficient $$\lambda_t = \frac{V_t}{V_d} = \frac{\sum_{n=1}^{BC} W_t}{\sum_{n=1}^{BC} V_n}$$

at each stop in the line $L_k$ on the dth day;

A2: calculating cash times $R_t=R_d*\lambda_t$ of the line $L_k$ at the stop $S_t$ on the dth day and the number of boarding passengers $P_t=V_t+R_t$ of the line $L_k$ at the stop $S_t$ on the dth day according to the cashier times $R_d$ and cashier coefficient $\lambda_t$;

in step 5, the scheduling optimization algorithm comprises following specific steps:

B1: using weighted arithmetic mean respectively on the historical cycle time and historical departure shifts of each vehicle within time periods of the starting time and ending time to obtain the historical average cycle time and historical average shifts for upgoing and downgoing of each line according to the historical operation shift data, combined with the line number, starting time and ending time in the intelligent scheduling table obtained in step 4, wherein the historical average cycle time is the planned cycle time and the historical average shifts are the planned departure shifts;

B2: predicting the line passenger flow at the execution time of the scheduling table through a machine learning algorithm LightGBM according to the line passenger flow, calculating the passenger flow of each line at the starting time and the ending time in the result of step 4, respectively calculating running times of each vehicle in each time period=(ending time−starting time)/2*the planned cycle time of the upgoing or the downgoing, and the number of allocated buses in each line at the starting time and ending time=the passenger flow in this time period/(single-ride average passenger capacity*running times of each bus in each time period), wherein the single-ride average passenger capacity is obtained from the passenger flow data of each line;

in step 6, the departure interval calculation algorithm specifically comprises following specific steps:

C1: actual departure shifts in each time period=passenger flow in this time period/single-ride average passenger capacity;

C2: deviation threshold=actual departure shifts/planned departure shifts in each time period, wherein if the deviation threshold is within the normal range, operation time per shift=(ending time−starting time)/actual departure shifts, otherwise, initial departure interval=(ending time−starting time)/2*(actual departure shifts+planned departure shifts);

C3: predicting the cross-section passenger flow of the at execution time of the scheduling table through the machine learning algorithm LightGBM according to the cross-section passenger flow, with the initial congestion coefficient=the maximum cross-section passenger flow/number of passengers in each time period at the execution time, adjustment time of congestion departure interval=actual departure interval*congestion coefficient*congestion adjustment parameters, wherein the congestion adjustment parameters are set according to the actual situation of buses;

C4: when the congestion coefficient>normal threshold coefficient, initial departure interval time=operation time per shift−adjustment time of congestion departure interval, and when the congestion coefficient<normal threshold coefficient, initial departure interval time=operation time per shift+adjustment time of congestion departure interval, wherein the normal threshold coefficient is set according to the actual situation of buses;

in step 8, the real-time departure interval adjustment algorithm specifically comprises following steps:

D1: calculating the congestion coefficient=the maximum cross-section passenger flow/number of passengers at the real-time stop, the adjustment time of congestion departure interval=initial departure interval*congestion coefficient*congestion adjustment parameters, where initial values of the congestion adjustment parameters are set according to the actual situation of buses; the large interval or traffic jam coefficient=the maximum distance between two buses/the normal distance threshold, the large interval or traffic jam adjustment time=initial departure interval*large interval or traffic jam coefficient*large interval or traffic jam adjustment parameters, wherein initial values of large interval or traffic jam adjustment parameters are set based on the actual situations of buses;

D2: when the congestion coefficient>the normal threshold coefficient, with the normal threshold coefficient set according to the actual situation of buses, adjusted departure interval time=initial departure interval-adjustment time of congestion departure interval; when the congestion coefficient<the normal threshold coefficient, the adjusted departure interval time=initial departure interval+adjustment time of congestion departure interval;

D3: the large interval or traffic jam coefficient>the normal threshold coefficient, with the normal threshold coefficient set according to the actual situation of buses, the adjusted departure interval time=initial departure interval-large interval or traffic jam adjustment time; when the congestion coefficient<the normal threshold coefficient, the adjusted departure interval time=initial departure interval+large interval or traffic jam adjustment time;

D4: calculating whether the congestion coefficient reaches the normal threshold every 1 minute, and training the congestion adjustment parameters, large interval or traffic jam adjustment parameters by using a deep neural network algorithm until optimal congestion adjustment parameters, large interval or traffic jam adjustment parameters are obtained;

D5: using the congestion adjustment parameters, the large interval or the traffic jam adjustment parameters obtained in D4 to update the congestion adjustment parameters, the large interval or the traffic jam adjustment parameters in D1 to obtain a final real-time departure interval.

2. The method according to claim 1, wherein in step 1, the boarding cashier data and the data of bus dispatching system in a specified time period are acquired for data preprocessing, invalid data and useless fields are eliminated, and obtained data are correlated to obtain su, sp, sc, $C_i$ and $M_n$.

3. The method according to claim 1, wherein there are two cases of payment by swiping card, wherein the first case is that the number of card swipes per day with the same card number is even; according to a card swiping for a second boarding by this card number on the same day in the opposite direction of an original line, a boarding card-swiping stop for this time is a drop-off card-swiping stop corresponding to a boarding card-swiping stop for last time, while a boarding card-swiping stop on the original line is also a drop-off card-swiping stop for a second boarding card-swiping, and drop-off card-swiping time=a time span between the boarding stop and the drop-off stop+the time of the boarding stop, thus obtaining the drop-off card-swiping stop and drop-off card-swiping time;

the second case is that the number of card swipes per day with the same card number are odd, wherein this crowd don't take fixed buses, and only have determined boarding stops, instead of determined drop-off stops; in this case, drop-off stops corresponding to boarding stops conform to an uniform distribution of the first case, and the drop-off stops corresponding to the boarding stops in the second case are obtained according to a percentage distribution mapping of each drop-off stop corresponding to the boarding stop in the first case and drop-off card-swiping time=a time span between boarding stop and drop-off stop+the time of boarding stop; cash-paying crowd and card-paying crowd are evenly distributed and from $V_t$ and $R_t$ obtained in A2, the cash coefficient $$\sigma = \frac{R_t}{V_t}$$

on the dth day is calculated, the number of boarding and drop-off people paying by cash=the number of boarding and drop-off people paying by cashier*σ, and the time of drop-off stop paid by cash is obtained through the same type of mapping.

* * * * *